3,255,193
MERCAPTOPYRIMIDINES
Mervin E. Brokke, Richmond, and Ashley H. Freiberg, Santa Clara, Calif., assignors to Stauffer Chemical Company, New York, N.Y., a corporation of Delaware
No Drawing. Filed Nov. 9, 1964, Ser. No. 409,936
6 Claims. (Cl. 260—251)

This invention relates to certain new and novel chemical compounds and to the use of such compounds as fungicides. More specifically, this invention relates to phenoxyalkylmercaptopyrimidines and to the utility of the compounds in microbiological compositions. The invention concerns compounds of the general formula

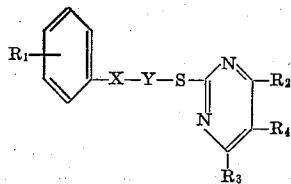

wherein $R_1$ is selected from the group consisting of hydrogen, lower alkyl, halogen and combinations thereof, $R_2$, $R_3$ and $R_4$ are selected from the group consisting of hydrogen, lower alkyl and mixtures thereof, X is selected from the group consisting of oxygen and sulfur and Y is lower alkylene.

The compounds of the present invention can be prepared by reacting the appropriate mercaptopyrimidine hydrochloride with an ω-halophenoxyalkyl or ω-halophenylthioalkyl in the presence of a base.

Reference is now made to the following non-limiting example which illustrates the preparation of a typical compound of the present invention.

EXAMPLE

*Preparation of 4-methyl-2-(2-phenoxyethylmercapto) pyrimidine.*—2-mercaptopyrimidine hydrochloride (16.4 g.) was dissolved in 200 ml. of methanol. Sodium hydroxide (8.0 g.) dissolved in 25 ml. of water was added. This was followed by the addition of β-chlorophenetole (15.7 g.). The resulting mixture was heated under reflux until neutral. The methanol was removed in vacuo. The residue was taken up in benzene, washed with water, dried and then distilled. The product boiled at 140–144° C. at 200µ. There was obtained 8.7 g. of material $n_D^{30}$ 1.5921. *Analysis.*—Calculated for $C_{13}H_{14}N_2OS$: Carbon, 63.5%; hydrogen, 5.7%. Found: Carbon, 63.55%; hydrogen 5.81%.

The following is a list of the compounds prepared following the aforedescribed procedure. Compound numbers have been assigned to each compound and are used throughout the balance of the application.

Table I

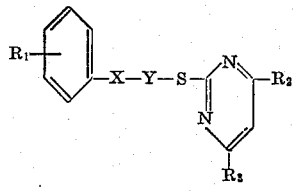

| Compound Number | $R_1$ | X | Y | $R_2$ | $R_3$ | $n_D^{30}$ |
|---|---|---|---|---|---|---|
| 1 | H | O | $CH_2CH_2$ | H | H | 1.5872 |
| 2* | H | O | $CH_2CH_2$ | $CH_3$ | H | 1.5921 |
| 3 | H | O | $CH_2CH_2$ | $CH_3$ | $CH_3$ | 1.5740 |
| 4 | 2-$CH_3$ | O | $CH_2CH_2$ | H | H | 1.5679 |
| 5 | 2-$CH_3$ | O | $CH_2CH_2$ | $CH_3$ | H | 1.5546 |
| 6 | 4-$CH_3$ | O | $CH_2CH_2$ | $CH_3$ | H | 1.5643 |
| 7 | 4-$CH_3$ | O | $CH_2CH_2$ | $CH_3$ | $CH_3$ | 1.5617 |
| 8 | 2,4-Cl | O | $CH_2CH_2$ | H | H | 1.5770 |
| 9 | 2,4-Cl | O | $CH_2CH_2$ | $CH_3$ | H | 1.5765 |
| 10 | 2,4,5-Cl | O | $CH_2CH_2$ | $CH_3$ | H | 1.5860 |
| 11 | H | S | $CH_2CH_2$ | H | H | 1.6123 |
| 12 | H | S | $CH_2CH_2$ | $CH_3$ | H | 1.5998 |
| 13 | H | S | $CH_2CH_2$ | $CH_3$ | $CH_3$ | 1.6041 |
| 14 | penta-Cl | S | $CH_2CH_2$ | H | H | (**) |
| 15 | H | O | $CH_2CH_2CH_2$ | H | H | 1.5900 |
| 16 | H | O | $CH_2CH_2CH_2$ | $CH_3$ | H | 1.5778 |
| 17 | H | O | $CH_2CH_2CH_2$ | $CH_3$ | $CH_3$ | 1.5719 |

*Compound Number 2 prepared in the example.
**M.P. 120-3° C.

As previously mentioned, the herein described compositions produced in the above-described manner are physiologically active compounds which are useful and valuable in controlling various organisms. The compounds of this invention were tested as fungicidal compositions in the following manner.

*Foliage fungicide test.*—This test indicates protectant action as well as eradicant and leaf systemic action against fungi attacking plant foliage. Exactly which action is operating is determined by evaluation tests. Pinto bean plants were sprayed with three concentrations of dissolved or suspended candidate chemical in water, 1000, 500 and 100 parts per million (p.p.m.). The active compound is dissolved in water and for this purpose it is recommended that a surface active agent or wetting agent be employed to facilitate formulation of the dispersion. After the sprayed plants were dried they were inoculated with bean rust or powdery mildew spores. Development of the rust infection required overnight treatment in a mist chamber following inoculation. Results were read when disease symptoms were distinct on untreated bean plants. Among the most active compounds to control rust within this test were compounds number 2, 100% control at 1000 p.p.m. and 75–100% control at 500 p.p.m; number 5, 100% at 1000 p.p.m.; number 12, at 100 p.p.m. gave 50–75% control; number 14 gave 75–100% inhibition at 1000 p.p.m., and number 17, 75–100% at 500 p.p.m. In the control of powdery mildew, number 2, 75–100% at 1000 p.p.m.; number 7, 75–100% at 1000 p.p.m., and number 17, 75–100% control at 1000 p.p.m.

*Foliage weathering test.*—To be of promise in commercial applications a compound must be capable of remaining on sprayed plants for a given length of time under various weathering conditions. Chemicals that are immediately hydrolyzed, volatilized, or otherwise inactivated made poor protectant fungicides. Although formulation and additives may aid the weathering ability of a compound, there must be some inherent weathering capacity present. The simulated weathering test tends to be more gentle than actual conditions; however, after two days and two nights in the moist chamber definite results will be evident. The treated and weathered pinto bean plants were inoculated with bean rust and thus allowed to develop disease symptoms. Among those compounds of Table I showing activity are number 12, 50–

75% rust control at 1000 p.p.m.; number 13, 75–100% rust control at 1000 p.p.m.; number 17, 50–75% rust control at 500 p.p.m. Compound number 2 gave 25–50% control of powdery mildew at 1000 p.p.m. under the weathering conditions herein described.

In order to determine the spectrum of activity of a compound, different diseases and host plants are employed. The treatment closely follows that in the above-described tests. Northern corn leaf blight is handled in the same manner as the bean rust. When using tomato blight (gray leaf spot of tomato) a cooler twenty-four hour moist period for infection is employed. Among the active candidates in these special tests were compounds number 2, 75–100% control of corn blight at 100 p.p.m.; 25–50% control of corn blight at 1000 p.p.m. by number 13, and number 17 gave 75–100% control of corn blight at 100 p.p.m. Both compounds 2 and 17 gave 75–100% control of tomato blight at 100 p.p.m.; number 5 gave 50–75% control at 100 p.p.m., and number 13 at 1000 p.p.m. gave 50–75% control of tomato blight.

The phenoxyalkylmercaptopyrimidines of the present invention find particular utility in microbiological applications and may be applied in a variety of ways at various concentrations. They may be combined with suitable carriers and applied as dusts, sprays or drenches. The solid and liquid formulations can be prepared by any of the conventional methods well-know by those skilled in the art. The amount applied will depend upon the nature of the utility. The rate of application may also vary with the microbiological use intended.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

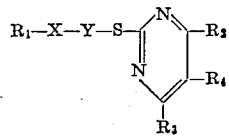

wherein $R_1$ is selected from the group consisting of phenyl and substituted phenyl, said substituents being selected from the group consisting of lower alkyl and halogen, X is selected from the group consisting of oxygen and sulfur, Y is lower alkylene and $R_2$, $R_3$ and $R_4$ are selected from the group consisting of hydrogen, lower alkyl and mixtures thereof.

2. The compound 2-(2-phenoxyethylmercapto) pyrimidine.
3. The compound 2-[2(4-methylphenoxy)ethylmercapto]-4,6-dimethylpyrimidine.
4. The compound 4-methyl-2-[2-(2,4-dichlorophenoxy)ethylmercapto] pyrimidine.
5. The compound 2-(2-phenylthioethylmercapto) pyrimidine.
6. The compound 2-(2-phenoxypropylmercapto)-4-methylpyrimidine.

References Cited by the Examiner
UNITED STATES PATENTS

| | | | |
|---|---|---|---|
| 2,958,624 | 11/1960 | Bimber | 167—33 |
| 2,969,362 | 1/1961 | Tweit | 260—251 |
| 2,971,884 | 2/1961 | Gruenhragen | 167—33 |
| 3,025,295 | 3/1962 | Tweit | 260—251 |

NICHOLAS S. RIZZO, *Primary Examiner.*